United States Patent
Pietilä et al.

(10) Patent No.: US 7,486,749 B2
(45) Date of Patent: Feb. 3, 2009

(54) DETERMINATION OF A CODE PHASE

(75) Inventors: Samuli Pietilä, Tampere (FI); Harri Valio, Kammenniemi (FI)

(73) Assignee: Nokia Corporation, Espoo (FI)

( * ) Notice: Subject to any disclaimer, the term of this patent is extended or adjusted under 35 U.S.C. 154(b) by 835 days.

(21) Appl. No.: 11/021,353

(22) Filed: Dec. 22, 2004

(65) Prior Publication Data

US 2006/0133463 A1 Jun. 22, 2006

(51) Int. Cl.
H04L 27/06 (2006.01)
H04B 1/707 (2006.01)
H04B 7/185 (2006.01)

(52) U.S. Cl. .................. 375/343; 375/150; 342/357.05; 342/357.06

(58) Field of Classification Search .................. 375/134, 375/137, 142, 143, 147, 150, 152, 260, 343; 370/335, 342; 342/357.05, 357.06, 357.12, 342/385
See application file for complete search history.

(56) References Cited

U.S. PATENT DOCUMENTS

| | | | |
|---|---|---|---|
| 5,982,811 A | | 11/1999 | Harrison et al. |
| 6,810,072 B1 * | | 10/2004 | Akopian ...................... 375/143 |
| 2001/0033606 A1 * | | 10/2001 | Akopian et al. ............. 375/149 |
| 2003/0108126 A1 * | | 6/2003 | Akopian ...................... 375/326 |
| 2004/0071200 A1 | | 4/2004 | Betz et al. |
| 2005/0232380 A1 * | | 10/2005 | Valio et al. .................. 375/343 |

OTHER PUBLICATIONS

"An integrated multi-scheme cell search platform for W-CDMA applications;" Chi-Fang Li et al.; Personal, indoor and mobile radio communications, 2003; 14th IEEE Proceedings on Sep. 7-10, 2003; vol. 2, Sep. 7, 2003; pp. 1197-1201.

"Simulation performance of a quantized log-likelihood sequential detector for PN code acquisition in the presence of data modulation and doppler shift;" K.V. Ravi et al; Military communications in a changing world; Nov. 4-7, 1991; Proceedings of the military communications conference, New York, IEEE; vol. 2, Nov. 4, 1999, pp. 798-803.

"Cell Search for 3GPP W-CDMA/FDD with Chip Clock Shift and Non-ideal Sampling;" Wern-Ho Sheen et al; VTC Fall 201; IEEE 54th, Vehicular technology conference; Oct. 7-11, 2001; vol. 1 of 4 Oct. 7, 2001; pp. 2369-2373.

* cited by examiner

*Primary Examiner*—Young T. Tse
(74) *Attorney, Agent, or Firm*—Alfred A. Fressola; Ware, Fressola, Van Der Sluys & Adolphson LLP

(57) ABSTRACT

The invention relates to determining a correct code phase of a received, code modulated carrier signal using a correlation portion, a frequency compensation portion, a coherent memory and a non-coherent memory. In order to compensate for a code Doppler effect and/or a carrier Doppler drift effect, a mapping portion maps correlation values either to the coherent memory or to the non-coherent memory. Alternatively, the mapping portion maps correlation values stored in the coherent memory or in the non-coherent memory to new positions. The mapping depends on a frequency compensation applied by the frequency compensation portion and elapsed integration time, and/or on a drift of a frequency offset in correlation values output by the correlation portion.

34 Claims, 10 Drawing Sheets

DETERMINATION OF A CODE PHASE

FIELD OF THE INVENTION

The invention relates to signal acquisition modules, electronic devices, systems, methods and software program products for determining a correct code phase of a received, code modulated carrier signal.

BACKGROUND OF THE INVENTION

The code phase of a received, code modulated carrier signal has to be determined for example in CDMA (Code Division Multiple Access) spread spectrum communications.

For a spread spectrum communication in its basic form, a data sequence is used by a transmitting unit to modulate a sinusoidal carrier, and then the bandwidth of the resulting signal is spread to a much larger value. For spreading the bandwidth, the single-frequency carrier can be multiplied for example by a high-rate binary pseudo-random noise (PRN) code sequence comprising values of −1 and 1, which code sequence is known to a receiver. Thus, the signal that is transmitted includes a data component, a PRN component, and a sinusoidal carrier component. The term chips is used to designate the bits of the PRN code conveyed by the transmitted signal, as opposed to the bits of the data sequence.

A well known system which is based on the evaluation of such code modulated signals is GPS (Global Positioning System). In GPS, code modulated signals are transmitted by several satellites that orbit the earth and received by GPS receivers of which the current position is to be determined. Currently, each of the satellites transmits two microwave carrier signals. One of these carrier signals L1 is employed for carrying a navigation message and code signals of a standard positioning service (SPS). The L1 carrier signal is modulated by each satellite with a different C/A (Coarse Acquisition) code known at the receivers. Thus, different channels are obtained for the transmission by the different satellites. The carrier signal has a frequency of 1575.42 MHz and the C/A code, which is spreading the spectrum over a nominal bandwidth of 20.46 MHz, is repeated every 1023 chips, the epoch of the code being 1 ms. The carrier frequency of the L1 signal is further modulated with the navigation information at a bit rate of 50 bit/s. The navigation information, which constitutes a data sequence, can be evaluated for example for determining the position of the respective receiver. The navigation information includes for example ephemeris parameters, which describes short sections of the orbit of the respective satellite. Based on these ephemeris parameters, an algorithm can estimate the position of the satellite for any time while the satellite is in the respective described section.

A receiver receiving a code modulated signal has to have access to a synchronized replica of the employed modulation code, in order to be able to de-spread the data sequence of the signal. More specifically, a synchronization has to be performed between the received code modulated signal and an available replica code sequence. Usually, an initial synchronization called acquisition is followed by a fine synchronization called tracking. In both synchronization scenarios correlation means are used to find and maintain the best match between the replica code sequence and the received signal and thus to determine the received code phase. The match can be determined for example with chip accuracy. If an accuracy of a fraction of a chip is needed, the chip can be presented by several samples after an analog-to-digital conversion.

During the acquisition, the phase of the received code modulated signal relative to the available replica code sequence can have any possible value due to uncertainties in the position of the receiver, to uncertainties in the available time and/or to a lack of ephemeris information.

Moreover, an additional frequency modulation of the received signal may occur, which can be as large as +/−6 kHz due to a Doppler effect and several kHz due to receiver oscillator frequency uncertainty. The search of the received code phase is therefore usually performed with different assumptions on an additional frequency modulation. For a sensitivity increase, in particular for weak signal environments like indoor environments, a receiver normally uses long integrations that require the frequency uncertainty to be as small as a few Hz. Therefore, even with the aligned code, a large number of frequency assumptions should be checked.

For illustration, FIG. 1 presents a schematic block diagram of a signal acquisition module of a conventional receiver.

In the receiver, a radio frequency (RF) part (not shown) converts a received signal to the base band using a local oscillator. The base band signal is then converted into the digital domain by an analog-to-digital (AD) converter (not shown) and enters the digital base band part of the receiver. The resulting samples are mixed by a mixer 12 with a search center frequency $e^{j\omega t}$. The mixed samples are then decimated by a decimation block 13 in accordance with a provided code frequency. The mixed and decimated samples are provided to a matched filter 14 to find out the code phase, or delay, of the received signal compared to an available replica code sequence. The matched filter 14 outputs continuously correlation values for each checked code phase.

The output of the matched filter 14 is provided to a Discrete Fourier Transform (DFT) bank 15 to eliminate any residual frequency left by the mixer 12, which will also be referred to as frequency offset. The DFT bank 15 mixes the output of the matched filter 14 for each checked code phase in parallel with a plurality of possible frequencies $e^{j\omega_1 t}$, $e^{j\omega_2 t}$, etc., $e^{-j\omega_1 t}$, $e^{-j\omega_2 t}$, etc.

The signal output by the AD converter has two unknown frequency components, a component resulting from the Doppler effect on the carrier frequency of the received signal and an oscillator error component. The combined uncertainty may be so large that the DFT bank 15 is not able to check the whole uncertainty range with a single search. In this case, several consecutive searches have to be carried out by the mixer 12 with different search center frequencies to cover the whole uncertainty range. The mixer 12 is thus used to adjust the search center frequency as necessary to cover large frequency uncertainties with several consecutive searches.

The signal entering the base band processing part might also have a known frequency offset after the down-conversion in the RF part. The mixer 12 can also be used to compensate for such a known offset.

After the DFT, the signal is integrated coherently and non-coherently until a sufficient signal-to-noise ratio is achieved for a reliable detection.

To this end, the results for each possible Doppler frequency are first added to a coherent memory 16. The coherent memory 16 is structured in the form of a table which comprises one column for each delay checked by the matched filter 14 for a respective code phase bin, and one row for each Doppler frequency checked by the DFT bank 15 for a respective DFT bin. Each entry of the table is thus associated to a combination of a particular code phase bin and a particular DFT bin. New correlation values for a particular combination are added for the respective duration of a coherent integration period.

In a subsequent non-coherent stage, consecutive coherent integration results for each combination are further integrated by summing the absolute or the squared values of these integration results. In the example of FIG. 1, a processing component 17 forms the sum over the squared I and Q components for each entry in the coherent memory 16. The output of the processing portion 17 is added to a corresponding entry in a non-coherent memory 18. The non-coherent memory 18 is structured in the same way as the coherent memory 16. New squared values are added for the respective duration of a non-coherent integration period.

If the assumptions on the code phase and the frequency modulation belonging to one combination are correct for the received code modulated signal, then the correlation results in a larger integration value than in the case of a misalignment or an inappropriate compensation of a frequency modulation. Thus, detecting the correlation peak in the non-coherent memory 18 and comparing it with a certain threshold allows finding the correct code phase and the correct frequency of modulation.

It has to be noted, however, that the Doppler effect has an influence not only on the carrier frequency of the received code modulated signal, but equally on the code repetition in this signal.

When a CDMA transmitter and a CDMA receiver are in motion relative to each other, the received carrier frequency will be different from the original transmitted carrier frequency due to the Doppler phenomenon. Since the ratio of carrier cycles per each code chip is fixed, the received spreading code rate will also be shifted from the transmitted code rate. This phenomenon is called code Doppler.

For example, in a GPS L1 C/A signal, the carrier frequency is 1575.42 MHz and the spreading code chip rate is 1.023 Mchip/s, as mentioned above. Hence, the code-to-carrier Doppler ratio is 1.023/1575.42=1/1540. This means that the code Doppler is always 1/1540 of the carrier Doppler.

It is a disadvantage of the signal acquisition module described with reference to FIG. 1 that the DFT bank 15 compensates only for the carrier Doppler effect, not the code Doppler effect. In practice this means that if the received signal happens to be in the middle DFT bin, namely when there is basically no Doppler effect present in the received signal or when the carrier Doppler effect has been compensated basically entirely by the mixer 12 and the code Doppler effect has been compensated basically entirely by the decimation block 13, the code Doppler compensation is correct and the acquisition works as expected. But if the signal is in one of the outermost DFT bins, the code Doppler compensation is no longer correct, and the signal will slide over several code phase bins during the search. In this case, the signal energy collected during the search is spread over several code bins. Therefore it becomes more difficult to detect the signal from the background noise.

So far, the problem of the code Doppler error has not been severe, since with the GPS L1 C/A signal, the code Doppler is much smaller than the carrier Doppler. The problem could thus be avoided by keeping the search times and DFT frequency coverage areas limited. However, this will change for example with the new GPS L5 signal and the Galileo signals, where the carrier frequency will be lower and the code frequency higher. In the GPS L5 signal, for example, the carrier frequency is 1176.45 MHz and the code chipping rate is 10.23 Mchip/s. Hence, the code-to-carrier Doppler ratio is 1/115, and thus more than 10 times worse than with the GPS L1 C/A signal.

The signal acquisition module of FIG. 1 could be configured for instance to cover a Doppler area of ±400 Hz. In the case of the GPS L1 C/A signal, the code Doppler error is 400/1540=0.26 chip/s, if the signal happens to be in the outmost DFT bin. In the case of the GPS L5 signal, the code Doppler error is 400/115=3.48 chip/s, if the signal happens to be in the outmost DFT bin. Assuming for example a total search time of one second and a code bin spacing of 0.5 chips, the L1 signal will drift by 0.26 chips during the search and will remain in one code bin. The L5 signal, in contrast, will drift by 3.48 chips during the search and will be spread over 7 code bins. Thus, in the latter case also the collected signal energy in each single code bin is only 1/7 of the total energy.

Moreover, the influence of the Doppler effect on the carrier frequency may change during the measurements, because the relative velocity between a transmitter and a receiver may change, or the oscillator frequency may drift. This change cannot be taken into account by the DFT bank 15 in the signal acquisition module of FIG. 1 either. That is, a signal does not stay in a single DFT bin of the DFT bank, but the signal energy is spread over several DFT bins.

It has to be noted that a similar problem may occur with any other receiver of code modulated signals, in particular with any other receiver for a Global Navigation Satellite System (GNSS).

In US Publication No. 2004/0071200 A1, the code Doppler problem is dealt with for another architecture, in which no coherent memory is employed. Here, extra delay lines and filters are used for delaying the output of cross-correlating means before adding it to a non-coherent memory. A possible drift of the carrier Doppler effect is not dealt with in this document.

SUMMARY OF THE INVENTION

The invention provides a possibility of compensating in an acquisition architecture employing a coherent memory code Doppler effects and/or a carrier Doppler drift effects in a received code modulated signal.

The invention proceeds from the consideration that for each frequency bin and each coherent integration cycle, the code Doppler error can be calculated. The invention proceeds further from the consideration that information on a drift of the carrier Doppler might be known. It is therefore proposed that the respective effect can be compensated in both cases by accumulating the correlation values at appropriate positions, either in the coherent memory or in the non-coherent memory, or by shifting already accumulated values accordingly.

It is an advantage of the invention that it enables longer integration times. This implies a better sensitivity of the architecture and a toleration of more frequency uncertainty.

It is further an advantage of the invention that a simple memory addressing is used for achieving the compensation effect. No extra hardware delay lines or filters are needed.

For a first aspect of the invention, a signal acquisition module for determining a correct code phase of a received, code modulated carrier signal is proposed. The proposed signal acquisition module comprises a correlation portion adapted to provide correlation values for different possible code phase offsets between a received, code modulated carrier signal and an available replica code sequence. The proposed signal acquisition module further comprises a frequency compensation portion adapted to compensate in correlation values output by the correlation portion a plurality of possible frequency offsets. The proposed signal acquisition module further comprises a coherent memory adapted to coherently accumulate during a respective coherent integration cycle correlation values provided by the frequency compensation portion for a respective combination of a specific code phase and a specific frequency compensation. The proposed signal acquisition module further comprises a non-coherent memory adapted to non-coherently accumulate during a non-coherent integration cycle correlation values accumulated in a respective completed coherent integration cycle in the coherent memory for a respective combination of a specific code phase and a specific frequency compensation. The proposed signal acquisition module further comprises a mapping portion adapted to map a correlation value which is to be added to one of the coherent memory and the non-coherent memory to a respective position in the memory, which position is associated to a combination of a specific code phase and a specific frequency compensation, and which position is adjusted depending on at least one of a frequency compensation applied by the frequency compensation portion in combination with elapsed integration time, and on a drift of a frequency offset in correlation values output by the correlation portion.

For the first aspect of the invention, moreover an electronic device is proposed which comprises the signal acquisition module proposed for the first aspect of the invention. For the first aspect of the invention, moreover a system is proposed which comprises the signal acquisition module proposed for the first aspect of the invention.

For the first aspect of the invention, moreover a method for determining a correct code phase of a received, code modulated carrier signal is proposed. The proposed method comprises determining correlation values for different possible code phase offsets between the received, code modulated carrier signal and the available replica code sequence. The proposed method further comprises compensating in the determined correlation values a plurality of possible frequency offsets. The proposed method further comprises coherently accumulating the frequency compensated correlation values during a respective coherent integration cycle in a coherent-memory for a respective combination of a specific code phase and a specific frequency compensation. The proposed method further comprises non-coherently accumulating coherently accumulated correlation values in the non-coherent memory during a non-coherent integration cycle for a respective combination of a specific code phase and a specific frequency compensation. The proposed method further comprises mapping a correlation value which is to be added to one of the coherent memory and the non-coherent memory to a respective position in the memory, which position is associated to a combination of a specific code phase and a specific frequency compensation, and which position is adjusted depending on at least one of a frequency compensation applied by the frequency compensation portion in combination with elapsed integration time, and on a drift of a frequency offset in the determined correlation values.

For the first aspect of the invention, finally a software program product is proposed, in which a software code for determining a correct code phase of a received, code modulated carrier signal is stored. When running in a signal acquisition module, the software code realizes the steps of the method proposed for the first aspect of the invention.

In the first aspect of the invention, the mapping is thus performed for values which are still to be accumulated coherently or non-coherently. That is, each accumulated correlation value in the coherent memory is mapped to a suitable position in the non-coherent memory, or each frequency compensated correlation value provided by the frequency compensation portion is mapped to a suitable position in the coherent memory.

For a second aspect of the invention, in contrast, the mapping is performed instead for values which are already stored in the coherent memory or in the non-coherent memory.

For the second aspect of the invention, a signal acquisition module, an electronic device and a system are proposed, which differ from the signal acquisition module, the electronic device and the system proposed for the first aspect of the invention only in the mapping portion.

For the second aspect of the invention, a mapping portion is adapted to map a correlation value stored in one of the coherent memory and the non-coherent memory at a position associated to a combination of a specific code phase and a specific frequency compensation to a respective new position in the memory. The new position is adjusted depending on at least one of a frequency compensation applied by the frequency compensation portion in combination with elapsed integration time, and on a drift of a frequency offset in correlation values output by the correlation portion.

For the second aspect of the invention, moreover a method and a software program product are proposed, which differ from the method and the software program product proposed for the first aspect of the invention in the mapping step.

For the second aspect of the invention, the method comprises a step of mapping a correlation value stored in one of the coherent memory and the non-coherent memory at a position associated to a combination of a specific code phase and a specific frequency compensation to a respective new position in the memory. The new position is adjusted depending on at least one of a frequency compensation applied by the frequency compensation portion in combination with elapsed integration time, and on a drift of a frequency offset in the determined correlation values.

In the second aspect of the invention, thus each accumulated correlation value in the non-coherent memory is mapped after a respective non-coherent integration step to a respective new position in the non-coherent memory, or each accumulated correlation value in the coherent memory is mapped after a respective coherent integration cycle to a respective new position in the coherent memory.

If the position depends in any of the aspects of the invention at least partly on a frequency compensation applied by the frequency compensation portion and on elapsed integration time, the selection of a position may compensate in particular for a code Doppler error resulting in a particular frequency bin in a particular integration cycle.

For a case that, in order to compensate for the code Doppler effect, a position would have to be selected which is not comprised by the respective memory, the mapping portion may be adapted to select a position at a beginning of all positions associated to the particular frequency compensation, if a position following comprised positions which are associated to the frequency compensation would have to be selected. Correspondingly, the mapping portion may be adapted to select a position at an end of all positions associated to the particular frequency compensation, if a position preceding comprised positions which are associated to the frequency compensation would have to be selected. Alternatively, those correlation values for which a position would have to be selected which is not comprised by the respective memory may simply be ignored. Existing positions to which no correlation value is mapped may then be filled with zeros.

If the position depends in any of the aspects of the invention at least partly on a drift of a frequency offset, the drift can be in particular due to a carrier Doppler drift, and the selection of the position may compensate in particular for this carrier Doppler drift resulting in a particular integration cycle.

For a case that, in order to compensate for the carrier Doppler effect, a position would have to be selected which is not comprised by the respective memory, the mapping portion may be adapted to select a position at a beginning of all positions associated to the particular code phase, if a position following comprised positions which are associated to the particular code phase would have to be selected. Correspondingly, the mapping portion may be adapted to select a position at an end of all positions associated to the particular code phase, if a position preceding comprised positions which are associated to the particular code phase would have to be selected. Alternatively, those correlation values for which a position would have to be selected which is not comprised by the respective memory may simply be ignored. Existing positions to which no correlation value is mapped may then be filled with zeros.

For both aspects of the invention, the calculations required for determining the position to which correlation values are to be added can be carried out by hardware and/or by software. A hardware structure can perform all required computations, if it is provided with the necessary information. In one exemplary embodiment for a combined hardware and software approach for the first aspect of the invention, there may be a register for each frequency bin. The software may then write the current position offset for each frequency bin on each non-coherent integration step. The hardware may then just read the register, and use the given offset for writing the results to the respective memory. A pure software solution, in which software reads for example each single coherent memory value and writes it to an appropriate non-coherent memory position, has the disadvantage in practice that the amount and the speed of the resulting data flow can be very high. It might thus considerably burden a digital signal processor in which the software is running.

For both aspects of the invention, the correlation means can be realized for example, though not exclusively, with a matched filter or a partial matched filter.

For both aspects of the invention, the frequency compensation portion can be realized for example, though not exclusively, with a DFT bank.

For both aspects of the invention, the non-coherent accumulation of correlation values may comprise for example summing the absolute values, the squared values or otherwise mapped values of the coherent accumulation results.

Both aspects of the invention may be employed for any receiver of code modulated signals, for example, though not exclusively, for a Global Navigation Satellite System (GNSS) receiver, like a GPS receiver, a Galileo receiver or a Glonass receiver.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 2:
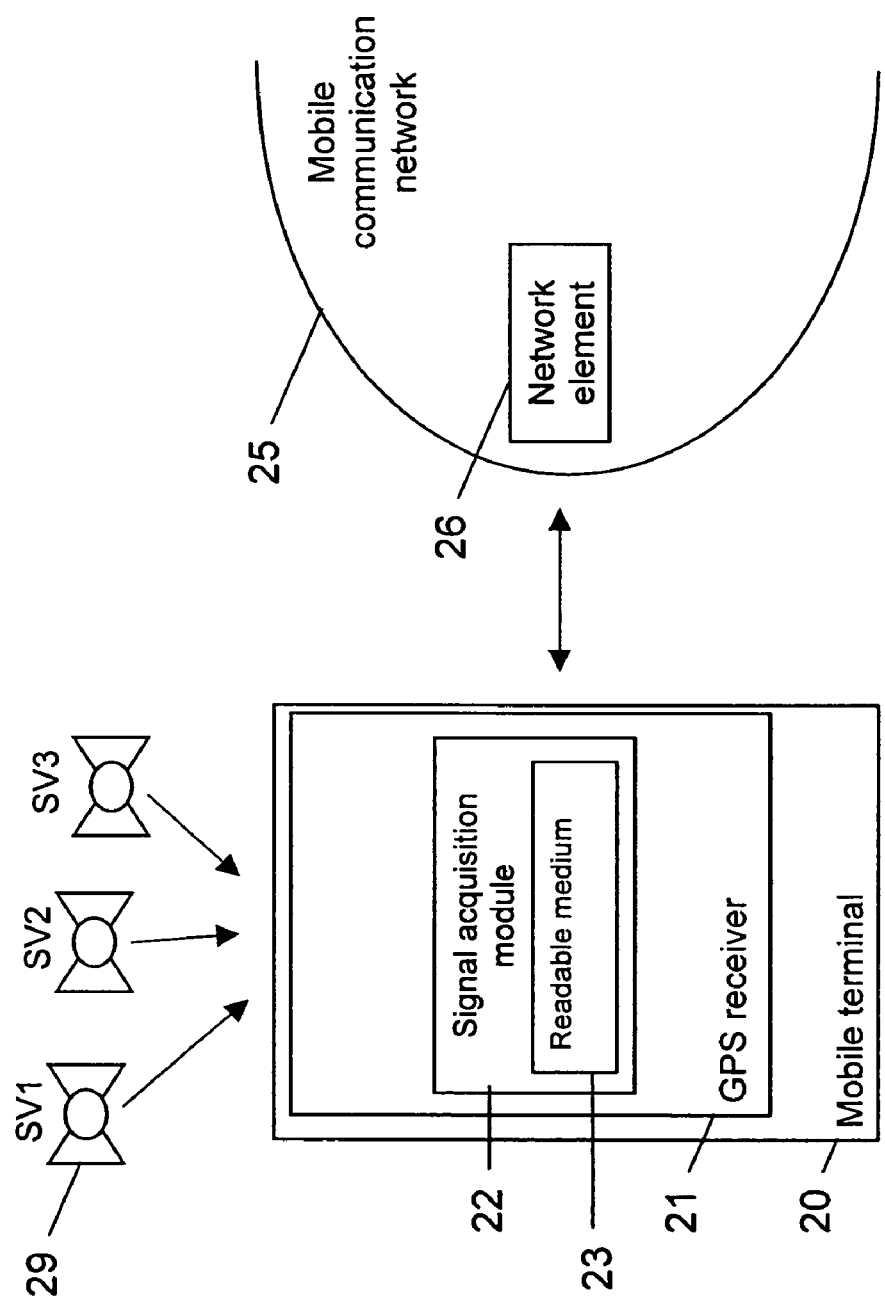
FIG. 2 is a schematic block diagram of a system according to an embodiment of the invention.

FIG. 2 is an exemplary positioning system in which a code Doppler error compensation according to the invention can be implemented.

The system comprises a mobile terminal 20 of which the position is to be determined, a plurality of GPS satellites SV1-SV3 29 and a mobile communication network 25.

The mobile terminal 20 is able to communicate with the mobile communication network 25 and is implemented to this end in a conventional manner. The mobile terminal 20 comprises in addition a GPS receiver 21, which is able to receive and process signals transmitted by GPS satellites 29. The GPS receiver 21 is constructed to this end in a conventional manner, except for a modification of a signal acquisition module 22. The mobile terminal 20 may receive assistance data from a network element 26 of the mobile communication network 25 and provide this assistance data to the GPS receiver 21 for assisting a signal acquisition.

Figure 3:
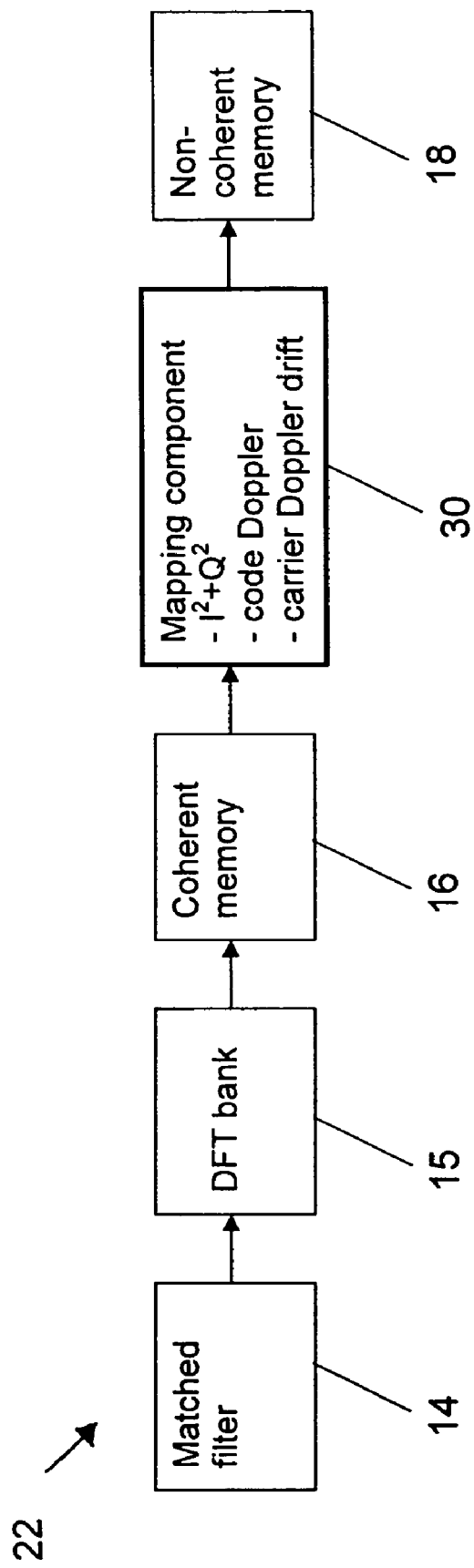
FIG. 3 is a schematic block diagram of a signal acquisition module according to a first embodiment of the invention.

A first embodiment of the signal acquisition module 22 according to the invention is presented in FIG. 3. It is a modification of the known signal acquisition module presented with reference to FIG. 1.

The signal acquisition module 22 comprises again a mixer and a decimation block (not shown), a matched filter 14, a DFT bank 15 and a coherent memory 16, as well as a readable memory 23 (see FIG. 2) for storing software code for determining a correct code phase of a received code modulated carrier signal. The coherent memory 16 is structured again in the form of a table which comprises one column for a respective code phase bin and one row for a respective DFT bin. The signal acquisition module 22 also comprises a non-coherent memory 18, which is structured again in the same way as the coherent memory 16.

Figure 1:
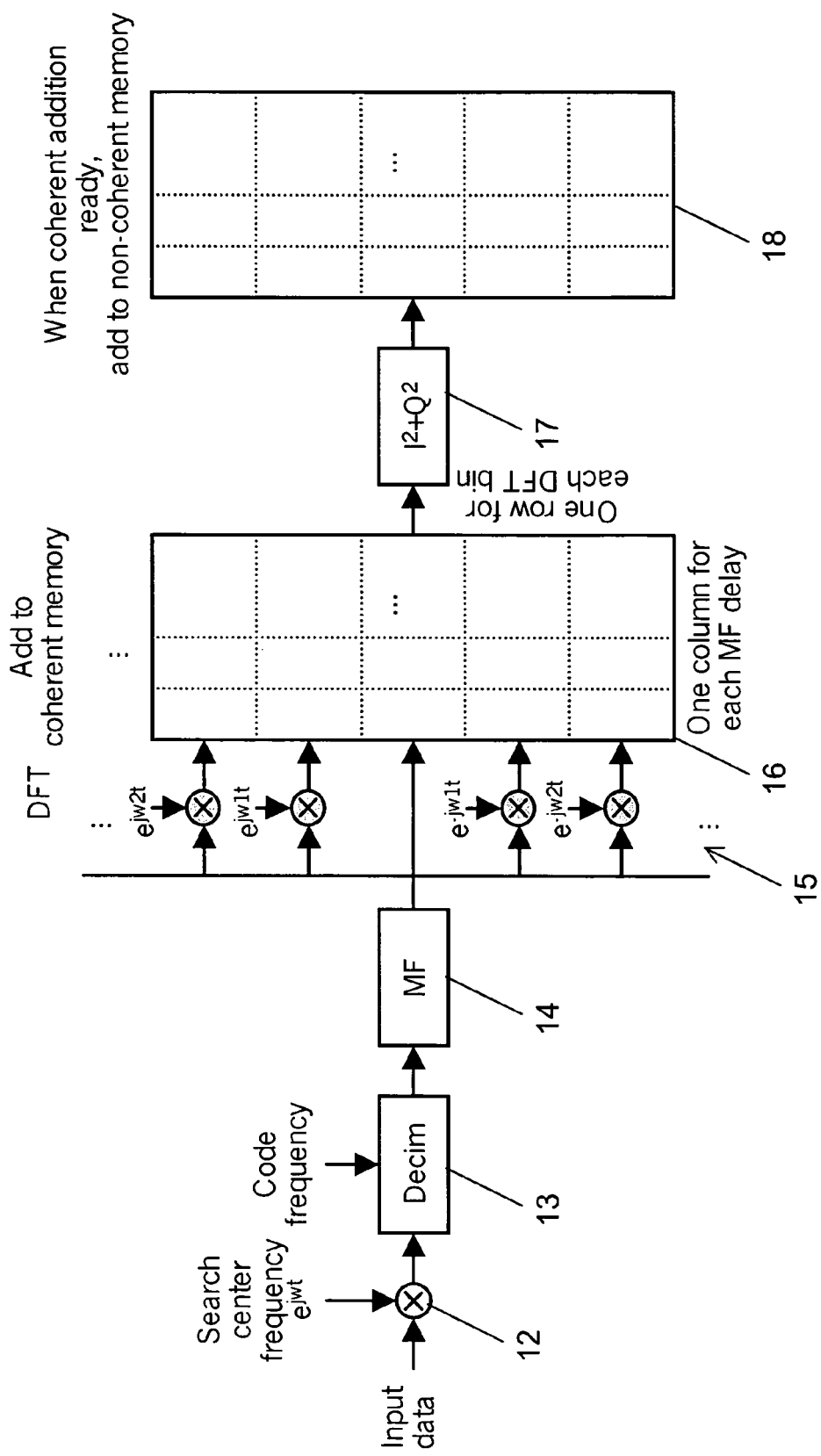
FIG. 1 is a block diagram illustrating a conventional signal acquisition module.

In contrast to FIG. 1, however, a mapping component 30 is inserted between the coherent memory 16 and the non-coherent memory 18. The function of the processing component 17 of the signal acquisition module of FIG. 1 is integrated by way of example in this mapping component 30.

The mapping component 30 comprises in addition a portion for a code Doppler error compensation and a portion for a carrier Doppler drift compensation.

Figure 4:
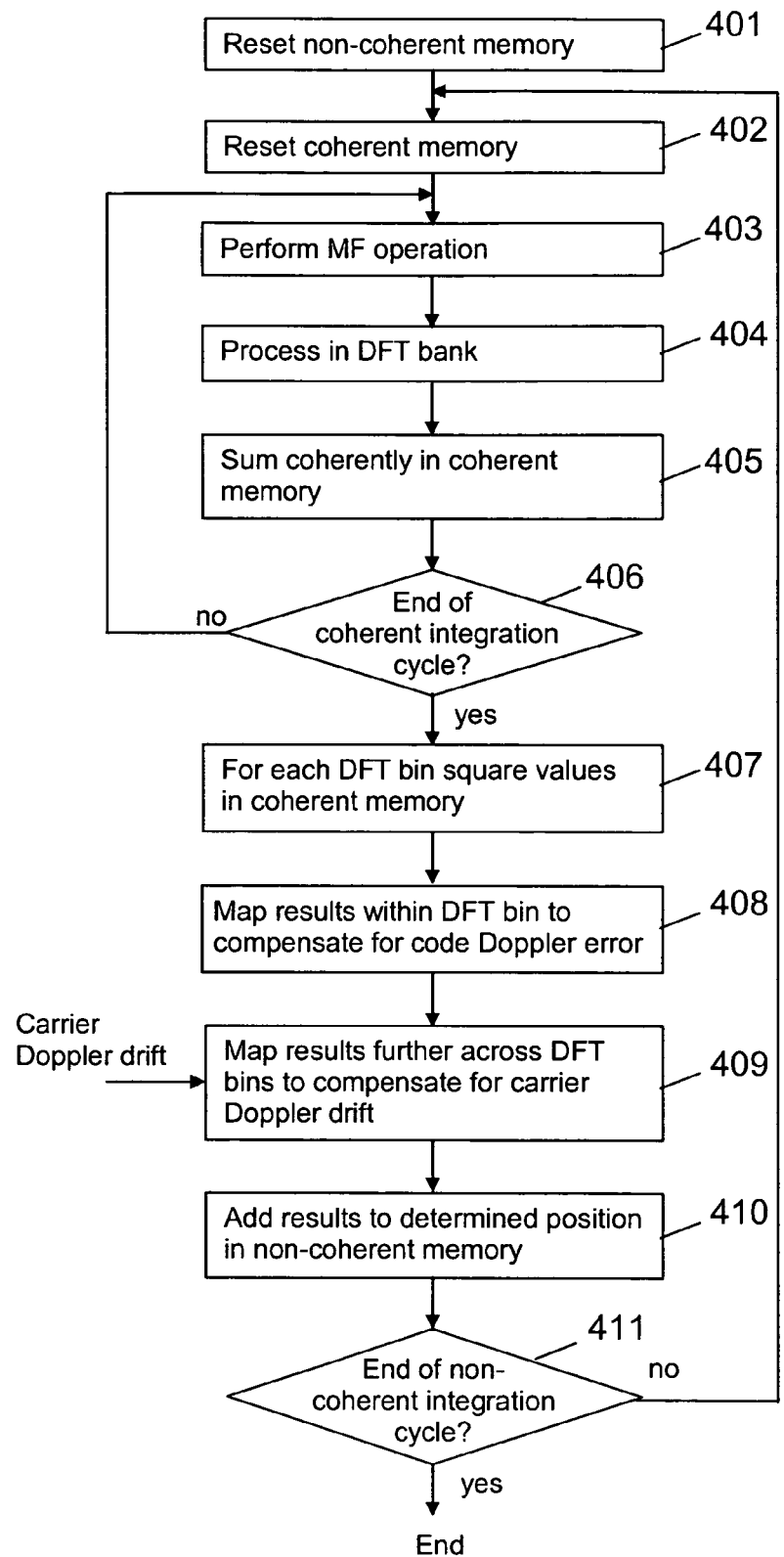
FIG. 4 is a flow chart illustrating the operation of the signal acquisition module of FIG. 3.

The operation of this signal acquisition module 22 is illustrated in FIG. 4.

For an initialization, the non-coherent memory and the coherent memory are reset (steps 401, 402). As a result, all entries of the memories have a value of zero.

After the processing of a received code modulated signal in the mixer and the decimation block, described above with reference to FIG. 1, the matched filter 14 computes correlation values for all possible code phase offsets between samples of a received satellite signal and a replica code sequence (step 403).

The DFT bank 15 then mixes the respective output of the matched filter 14 in parallel with a plurality of possible Doppler frequencies $e^{j\omega 1 t}$, $e^{j\omega 2 t}$, etc., $e^{-j\omega 1 t}$, $e^{-j\omega 2 t}$, etc. (step 404) The resulting correlation values for each possible Doppler frequency are added to an entry in the coherent memory 16 provided for the respective combination of code phase and DFT bin (step 405).

Consecutive correlation values output by the DFT bank 15 are continued to be added to the appropriate entries of the coherent memory 16 during a respective coherent integration period, for example during 20 ms, before the coherent memory 16 is reset for a new integration cycle (steps 406, 405).

Before the coherent memory 16 is reset (step 402), all entries are retrieved by the mapping component 30. The mapping component 30 forms the sum over the squared I and Q components for each retrieved entry (step 407). Further, it maps the squared values to an entry in the non-coherent memory 18 within the original DFT bin across the code phase bins such that a respective code Doppler error is compensated (step 408). In case a carrier Doppler drift is reported, the mapping component 30 maps the squared values in addition within the resulting code phase bin across the DFT bins such that the carrier Doppler drift is compensated as well (step 409).

For the mapping, the mapping component 30 has to calculate for each non-coherent integration step, how much the code has drifted so far during the search in each DFT bin.

The code drift can be expressed by the following relation:

Code drift=elapsed integration time*Doppler bin frequency/carrier per code ratio For the GPS L1 C/A code, for example, the center frequency of the satellite carrier is 1575.42 MHz and the chip rate is 1.023 Mchip/s. The carrier per code ratio is thus 1575.42 MHz/1.023 Mchip/s=1540 cycle/chip. If by now 100 non-coherent integrations have been performed, that is, 100 values have been added to each entry in the non-coherent memory 18, and each value is based on 20 ms of coherent integration, the elapsed integration time so far is 2 seconds. Thus, assuming a Doppler bin frequency of 800 Hz, the code drift can be determined for the current situation to be:

Code drift=2s*800 Hz/1540/chip≈1.04 chip

Each entry in the coherent memory 16 and the non-coherent memory 18 corresponds to a specific code phase, where the code phases differ from each other in steps of samples, not of chips. Thus, the code drift still has to be determined in terms of samples. To this end, first the width of each code bin in the memories is determined:

Bin width=chip rate/sample rate

For the example of the GPS L1 C/A code and a sampling rate of 2 MHz, the bin width is thus:

Bin width = $1.023 M \text{chip}/s / 2M \text{sample}/s$

≈ 0.51 chip/sample

The code drift per bin width then corresponds to the drift in terms of samples. Proceeding from the bin width, the mapping component 30 can thus determine by how many samples the non-coherent integration code bin has to be adjusted. In the above example, the following number of samples is obtained:

Floor(code drift/bin width) = floor(1.04 chip/0.51 chip/sample)

= floor(2.04 sample)

= 2 sample

Thus, for the DFT bin of 800 Hz in the $101^{st}$ non-coherent integration step, the squared I and Q components for each retrieved entry have to be mapped to an entry in the non-coherent memory 18 which is shifted by two samples, and thus two code bins, compared to the entry in the coherent memory 16.

The squared I and Q components are then added to the entry in the non-coherent memory 18 to which they have been mapped (step 410).

The same computations are performed for each DFT bin in each integration step, until the non-coherent integration cycle has been completed (steps 402 to 411).

Figure 5:
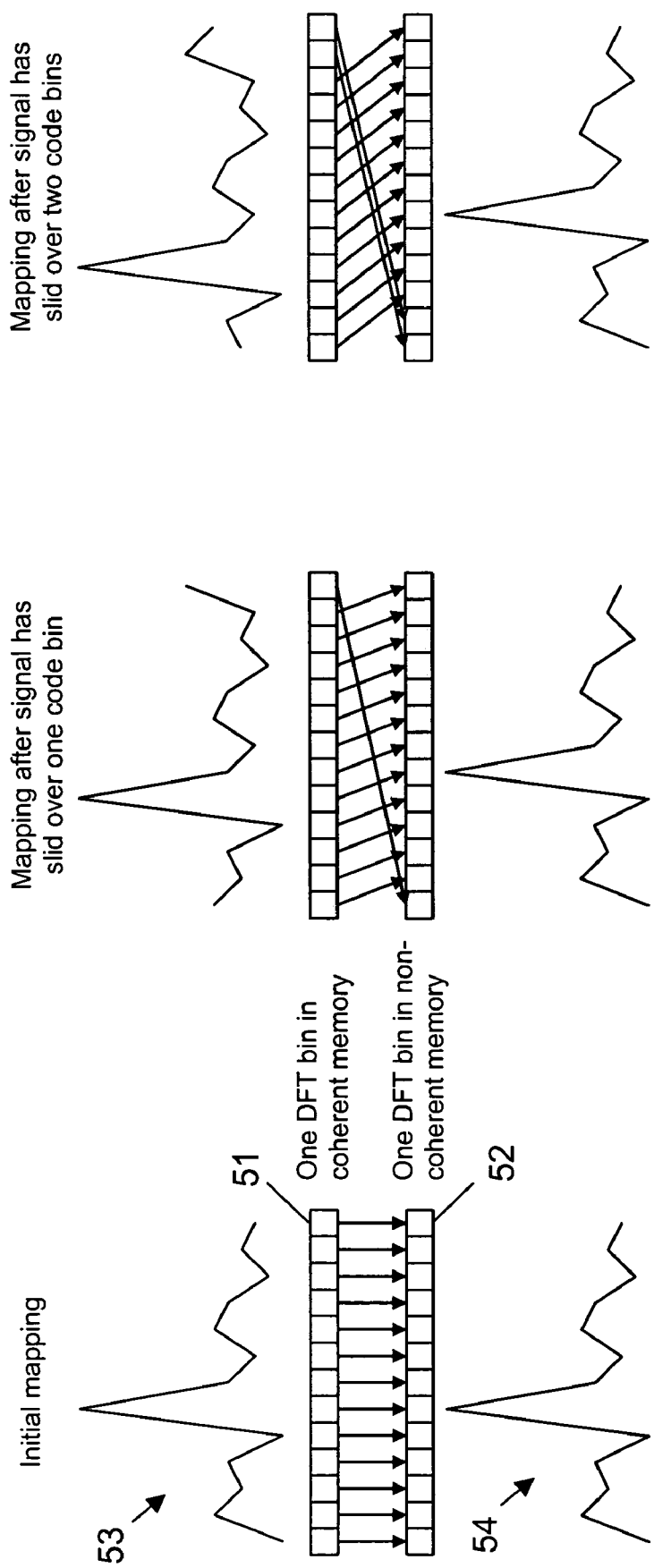
FIG. 5 is a diagram illustrating the operation of a mapping component of the signal acquisition module of FIG. 3.

The described mapping is also illustrated schematically in FIG. 5. FIG. 5 presents three diagrams, one on the left hand side, one in the middle and one on the right hand side of FIG. 5. Each diagram comprises one DFT bin 51 in the coherent memory 16 and the same DFT bin 52 in the non-coherent memory 18 aligned to each other. Above the DFT bin in the coherent memory 16, the values 53 for each code bin in the coherent memory 16 are depicted, while below the DFT bin in the non-coherent memory 18, the values 54 for each code bin in the non-coherent memory 18 are depicted.

The first diagram on the left hand side of FIG. 5 illustrates the situation at the beginning of a non-coherent integration, in which the code Doppler error has no effect so far. That is, in the above described computations, a code drift of zero samples is determined. Therefore, the value of each entry for the presented DFT bin in the coherent memory 16 is mapped after squaring to the same entry for the presented DFT bin in the non-coherent memory 18. This corresponds to the approach used for all integration steps in the signal acquisition module presented with reference to FIG. 1. As can be seen in the presentation above and below the DFT bins, the correlation values in the DFT bin are aligned in the coherent memory 16 and the non-coherent memory 18 without code Doppler error compensation.

The second diagram in the middle of FIG. 5 illustrates the situation after some non-coherent integration steps. In the above described computations, a code drift of one sample is now determined. In the above described example for the DFT bin of 800 Hz, this would be the case after approximately 50 integration steps. The code drift is represented by a shift of the values for each code bin in the coherent memory 16 presented above the DFT bin. Therefore, the value of each entry for the DFT bin in the coherent memory 16 is mapped after squaring to the respective next entry for the DFT bin in the non-coherent memory 18. The value in the last entry for this DFT bin in the coherent memory 16 is mapped to the first entry for this DFT bin in the non-coherent memory 18. As can be seen in the presentation below the DFT bins, the code drift in the coherent memory 16 has been compensated in the non-coherent memory 18.

The third diagram on the right hand side of FIG. 5 illustrates the situation after some more non-coherent integration steps. In the above described computations, a code drift of two samples is now determined. In the above example for the DFT bin of 800 Hz, this is the case after approximately 100 integration steps. The increased code drift is represented by a further shift of the values for each code bin in the coherent memory 16 presented above the DFT bins. Therefore, the value of each entry for the DFT bin in the coherent memory 16 is mapped after squaring to the next but one entry for this DFT bin in the non-coherent memory 18. The last entries of the coherent memory 16, which do not have a counterpart in the non-coherent memory 18 anymore, are mapped to the first entries of the non-coherent memory 18. As can be seen in the presentation below the DFT bins, the increased code drift in the coherent memory 16 has been compensated in the non-coherent memory.

In addition to a mapping across the code bins, the mapping may also be performed across the DFT bins, in case a carrier Doppler drift occurs during the search. Similar computations are performed as described for the code Doppler error compensation based on a known drift.

Figure 6:
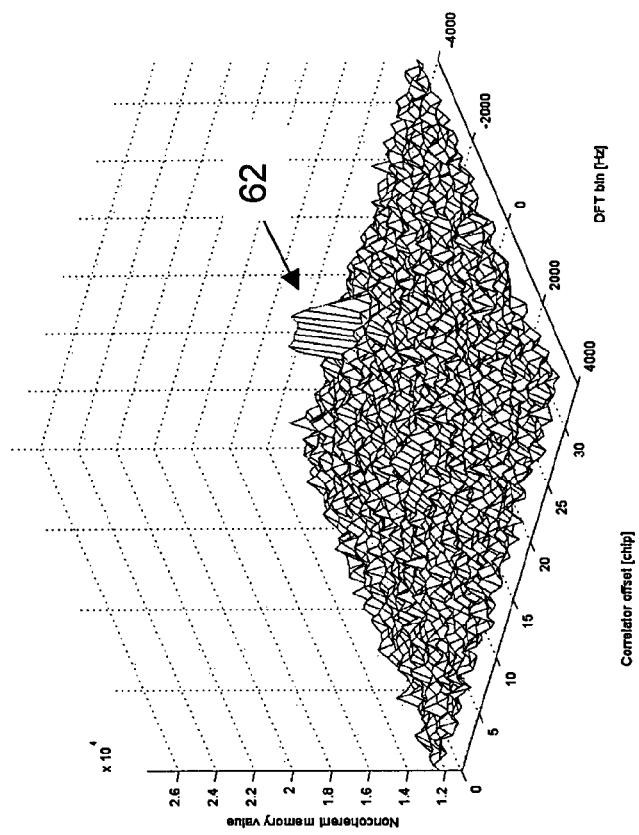
FIG. 6 presents exemplary correlation results obtained with the signal acquisition module of FIG. 1.
Figure 6:
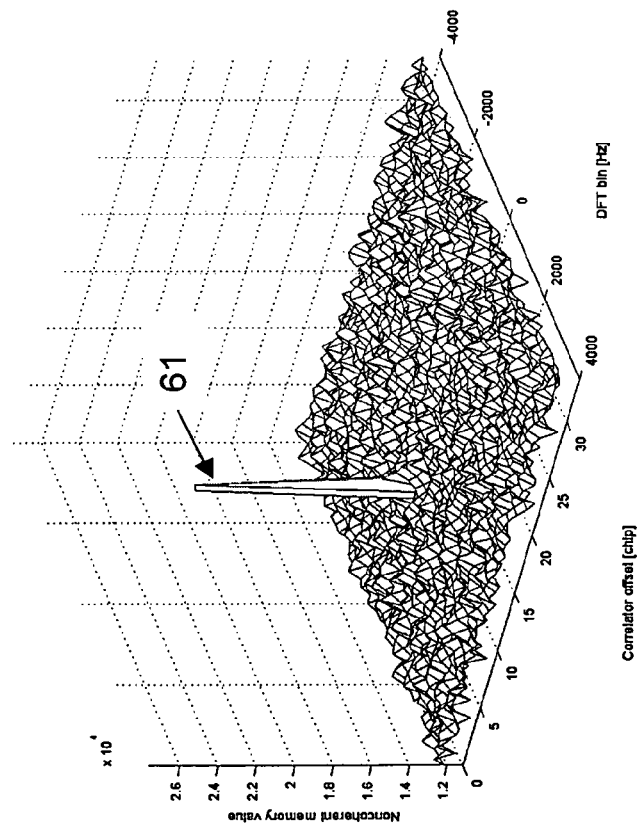
Figure 7:
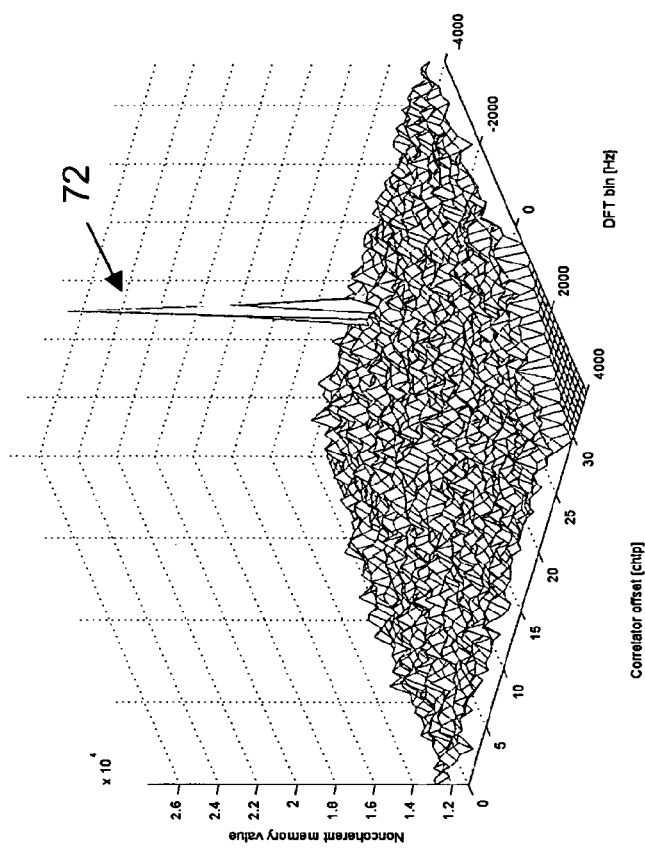
FIG. 7 presents exemplary correlation results obtained with the signal acquisition module of FIG. 3.
Figure 7:
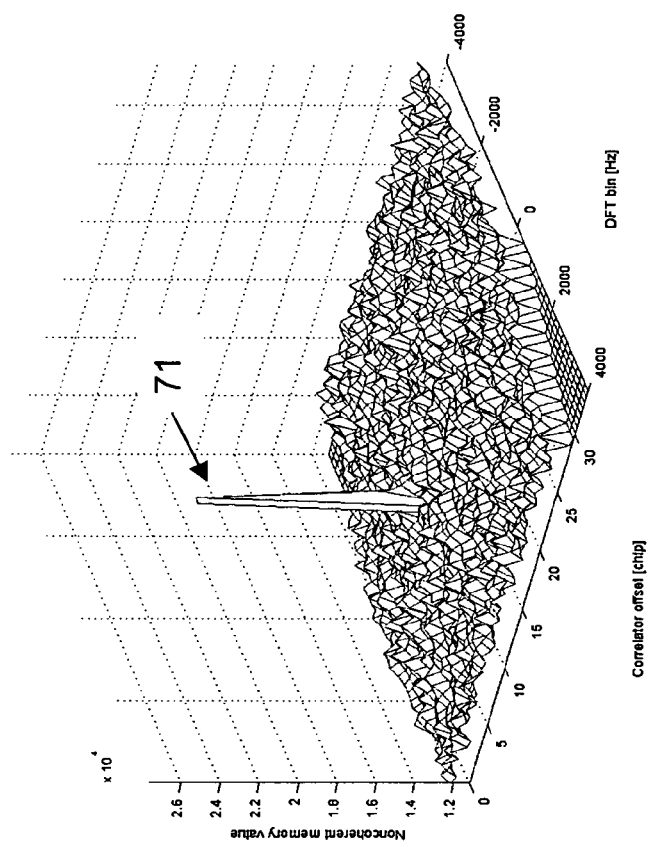

FIGS. 6 and 7 illustrate an enhancement which can be achieved with the presented embodiment of the invention. Both Figures present two diagrams, each showing non-coherent memory values over the code bins in chips and the DFT bins in Hz.

For a clearer presentation, it was assumed that no carrier Doppler drift is present.

FIG. 6 presents in a first diagram on the left hand side the content of a non-coherent memory 18 after a conventional search when the signal 61 is in the middle DFT bin. In the middle DFT bin, no code Doppler error occurs and the signal 61 can easily be detected. A carrier Doppler drift would spread the signal 61 over several DFT bins, which would lower the peak signal level.

FIG. 6 presents in a second diagram on the right hand side the content of the non-coherent memory 18 after a conventional search when the signal 62 is in an outer DFT bin. Due to the code Doppler error, the signal 62 is now spread over several code bins, and consequently, the level of the signal in each bin is clearly less than the peak level in the diagram on the left hand side of FIG. 6. In some cases, it may be below a detection threshold. A carrier Doppler drift would spread the signal 62 in addition over several DFT bins, which would lower the level of the signal even further.

FIG. 7 presents in a first diagram on the left hand side the content of the non-coherent memory 18 after a search in accordance with the invention when the signal 71 is in the middle DFT bin. As no code Doppler error occurs in the middle DFT bin, the situation is the same as in the diagram on the left hand side of FIG. 6. In contrast to the diagram on the left hand side of FIG. 6, the signal 71 in the diagram on the left hand side of FIG. 7 would also be the same in case of a carrier Doppler drift due to the implemented carrier Doppler drift compensation.

FIG. 7 presents in a second diagram on the right hand side the content of the non-coherent memory 18 after a search in accordance with the invention when the signal 72 is in an outer DFT bin. Here, the code Doppler compensation has prevented a spreading of the signal 72 over several code bins which is present in the diagram on the right hand side in FIG. 6. As a result, this signal 72 can easily be detected as well. Also a carrier Doppler drift would be compensated.

Figure 8:
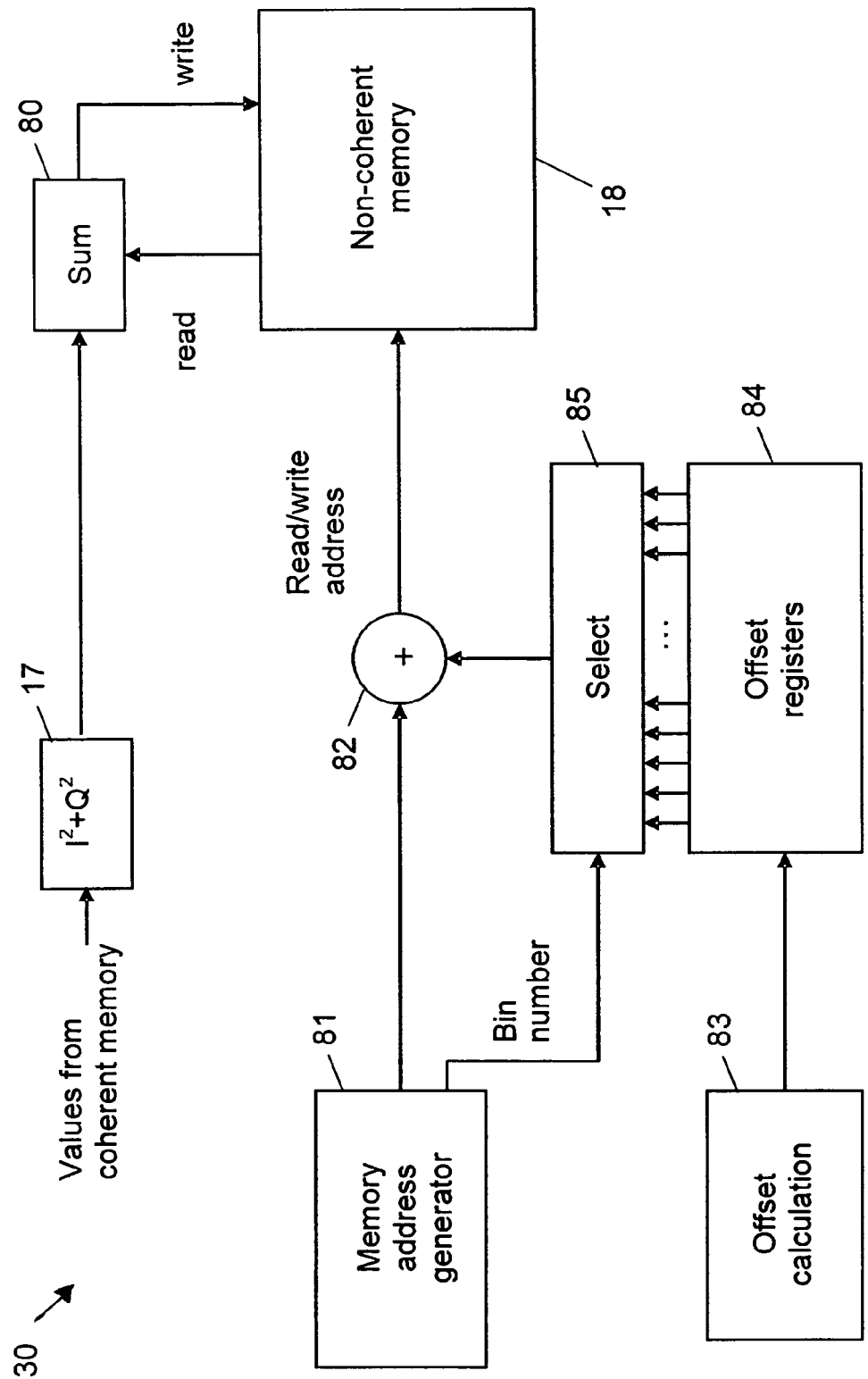
FIG. 8 is a schematic block diagram of an exemplary realization of a mapping component in the system of FIG. 3.

FIG. 8 is a block diagram of a possible embodiment of the code Doppler compensation in the mapping component 30 in FIG. 3, which realizes steps 407 to 410 of FIG. 4.

The mapping component 30 comprises a squaring block 17, which is connected via a summing block 80 to a read/write input of the non-coherent memory 18. The squaring block 17 may correspond to the squaring component 17 which is used in the system of FIG. 1. In addition, a memory address generator 81 is connected via a summing block 82 to a read/write address input of the non-coherent memory 18. The mapping component 30 further comprises an offset calculation block 83, which has a writing access to offset registers 84. A select block 85 has a reading access to the offset registers 84 and an output connected to the summing block 82. The memory address generator 81 has moreover access to a control input of the select block 85. The offset calculation block 83 is realized by software, all other components are realized in hardware.

For each non-coherent iteration step, the memory address generator 81 generates for each frequency bin one after the other the address of all entries in the non-coherent memory 18. This address is provided via the summing block 82 to the non-coherent memory 18, and the summing block 80 reads the respective value at this memory address. The summing block 80 further receives the squared value from the same address of the coherent memory 16. The summing block 80 then writes the sum of the read value and the received squared value to the same address of the non-coherent memory 18 from which a value was extracted.

The offset calculation block 83, however, computes in addition for each frequency bin an offset suited to compensate for a code Doppler error in the respective non-coherent integration cycle. The offset values for each frequency bin are written to the offset registers 84 on each non-coherent integration cycle.

The memory address generator 81 indicates the current frequency bin to the select block 85. The select block 85 extracts thereupon the offset which is currently stored in the offset registers for this frequency bin. The select block 85 provides this offset value to the summing block 82, where it is added to the address value which is currently output by the memory address generator 81. The summing block 82 adjusts the received address value according to the received offset value and forwards the adjusted address to the non-coherent memory 18. When the summing block 80 reads a value from the non-coherent memory 18, it does thus not read a value from the address given by the address generator 81, but from an address which is offset by an appropriate value. Equally, when the summing block 80 writes back the sum of the read value and a received squared value, it does not write the sum to the address given by the address generator 81, but to an address which is offset by an appropriate value.

Thus, software writes the offsets for each Doppler bin to registers, and hardware uses the register values to offset the original addressing.

Figure 9:
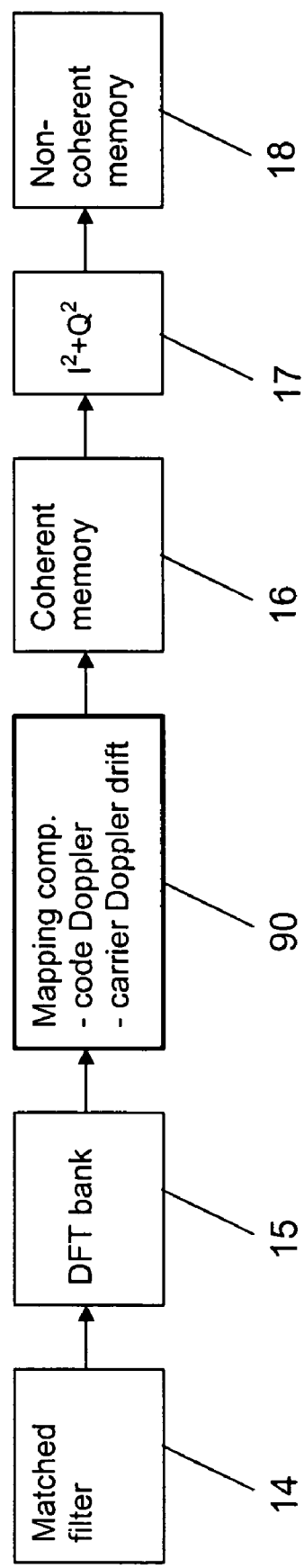
FIG. 9 is a schematic block diagram of a signal acquisition module according to a second embodiment of the invention.

FIG. 9 presents a second embodiment of the signal acquisition module 22 of the GPS receiver 21 in FIG. 2. Also this embodiment is a modification of the signal acquisition module presented with reference to FIG. 1.

The signal acquisition module 22 comprises a mixer and a decimation block (not shown), a matched filter 14, a DFT bank 15, a coherent memory 16, a processing component 17 and a non-coherent memory 18. Both memories 16, 18 are structured in the same way as the memories 16, 18 in FIGS. 1 and 3.

In contrast to FIG. 1, however, a mapping component 90 is inserted between the DFT bank 15 and the coherent memory 16. The mapping component 90 realizes a code Doppler compensation and a carrier Doppler drift compensation.

The operation of this signal acquisition module 22 is the same as illustrated in FIG. 4, except that the order of processing is changed. More specifically, the code Doppler compensation in step 408 and the possible carrier Doppler drift compensation in step 409 are already performed when adding the correlation values output by the DFT bank 15 to the coherent memory 16, that is, before step 405. Thus, the values output by the DFT bank 15 are mapped to entries of the coherent memory 16 with a shift in the code bin and possibly in the DFT bin, which is calculated anew for each coherent integration cycle and thus for each non-coherent integration step. In the above example assuming a coherent integration time of 20 ms, a new mapping is thus determined after each 20 ms as before. It is to be understood that alternatively, it could also be determined after every single coherent addition.

The squared values computed by the processing component 17 for the values in a particular entry of the coherent memory 16 can then simply be added to the corresponding entry in the non-coherent memory 18, as in the conventional signal acquisition module.

The final values in the non-coherent memory 18 are essentially the same in the embodiment of FIG. 9 as in the embodiment of FIG. 3.

Figure 10:
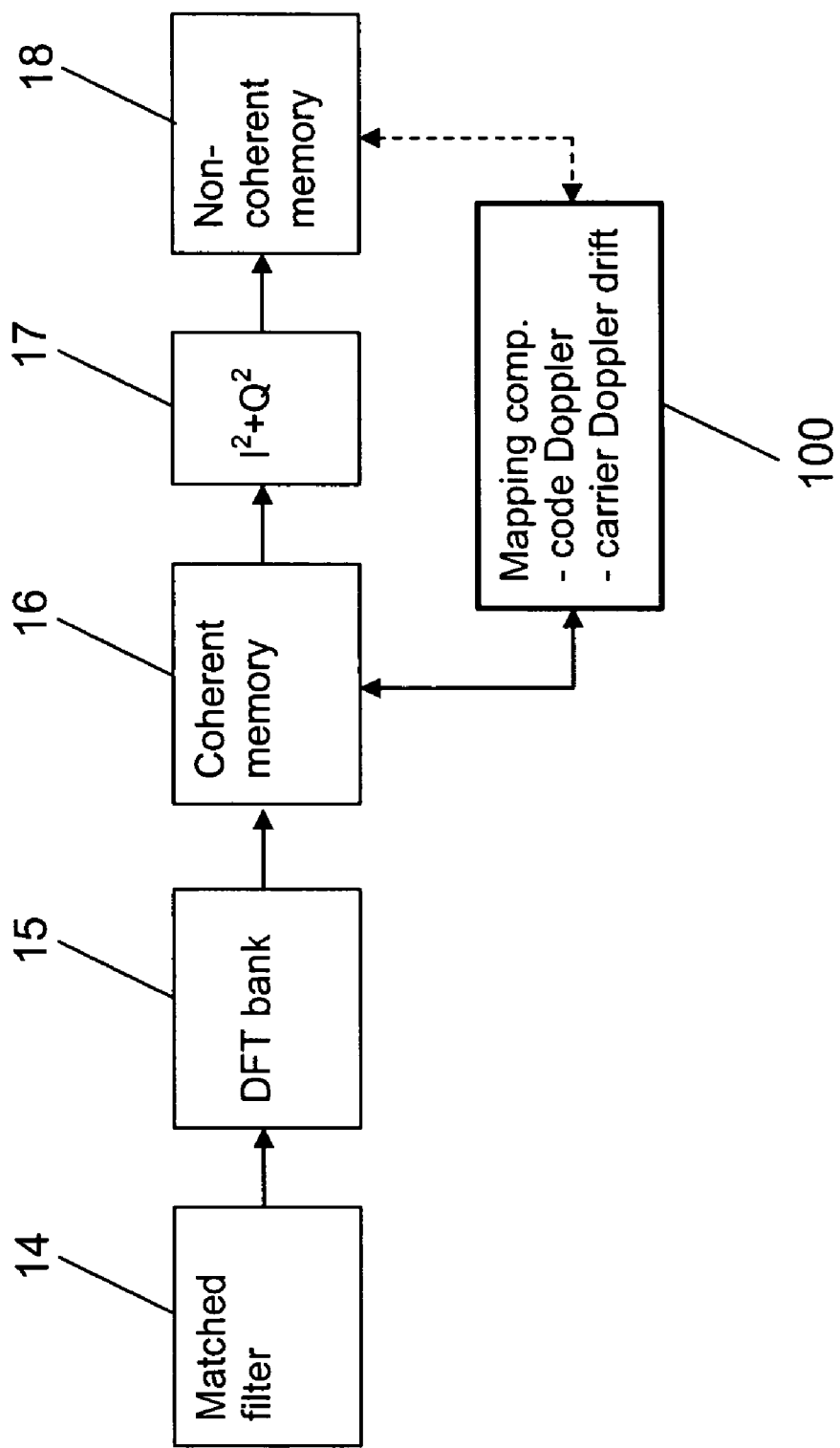
FIG. 10 is a schematic block diagram of a signal acquisition module according to a third and a fourth embodiment of the invention.

FIG. 10 presents a third and fourth embodiment of the signal acquisition module 22 of the GPS receiver 21 in FIG. 2. Also these embodiments are modifications of the signal acquisition module presented with reference to FIG. 1.

The signal acquisition module 22 comprises again a mixer and a decimation block (not shown), a matched filter 14, a DFT bank 15, a coherent memory 16, a processing component 17 and a non-coherent memory 18. Both memories 16, 18 are structured in the same way as the memories 16, 18 in FIG. 1.

In contrast to FIG. 1, however, a mapping component 100 has access either to the coherent memory 16 or to the non-coherent memory 18, the latter alternative being indicated in FIG. 10 by dashed lines. The mapping component 100 realizes a code Doppler compensation and a carrier Doppler drift compensation in accordance with the invention.

If the mapping component 100 has access to the coherent memory 16, the operation of the signal acquisition module 22 is the same as illustrated in FIG. 4, except that the mapping described with reference to steps 408 and 409 is performed already within the coherent memory after each coherent integration cycle, and thus before step 407. That is, the data accumulated in the coherent memory 16 is shifted within the coherent memory 16 before it is provided for squaring to the processing portion 17.

If the mapping component 100 has access to the non-coherent memory 18, the operation of this signal acquisition module 22 is also similar to the operation illustrated in FIG. 4. In this case, the mapping described with reference to steps 408 and 409 is performed within the non-coherent memory 18 after each non-coherent integration step. That is, the data accumulated in the non-coherent memory 18 is shifted within the non-coherent memory 18 after a respective new set of correlation values has been added in step 410.

While it has been shown and described and pointed out fundamental novel features of the invention as applied to an embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus for determining a correct code phase of a received, code modulated carrier signal, said apparatus comprising:
    a correlation portion configured to provide correlation values for different possible code phase offsets between the received, code modulated carrier signal and an available replica code sequence;
    a frequency compensation portion configured to compensate in the correlation values output by said correlation portion a plurality of possible frequency offsets;
    a coherent memory configured to coherently accumulate during a respective coherent integration cycle correlation values provided by said frequency compensation portion for a respective combination of a specific code phase offset and a specific frequency compensation;
    a non-coherent memory configured to non-coherently accumulate during a non-coherent integration cycle the correlation values accumulated in a respective completed coherent integration cycle in said coherent memory for a respective combination of a specific code phase offset and a specific frequency compensation; and
    a mapping portion configured to map a correlation value which is to be added to one of said coherent memory and said non-coherent memory to a respective position in said coherent memory or said non-coherent memory, respectively, which position is associated to the combination of the specific code phase offset and the specific frequency compensation for which said correlation value is provided, and which position is adjusted depending on at least one of a frequency compensation applied by said frequency compensation portion in combination with elapsed integration time and a drift of a frequency offset in the correlation values output by said correlation portion.

2. The apparatus according to claim 1, wherein said mapping portion is configured to map each accumulated correlation value in said coherent memory to a respective position in said non-coherent memory.

3. The apparatus according to claim 1, wherein said mapping portion is configured to map each frequency compensated correlation value provided by said frequency compensation portion to a respective position in said coherent memory.

4. The apparatus according to claim 1, wherein in case said position depends at least on the frequency compensation applied by said frequency compensation portion and the elapsed integration time, said mapping portion is configured to select said position among all positions associated to said frequency compensation to compensate for a code Doppler effect.

5. The apparatus according to claim 4, wherein for a case that, in order to compensate for said code Doppler effect, a position would have to be selected which is not comprised by said coherent memory or said non-coherent memory, respectively, said mapping portion is configured to select a position at a beginning of all positions associated to said frequency compensation, if a position following comprised positions which are associated to said frequency compensation would have to be selected, and at an end of all positions associated to said frequency compensation, if a position preceding comprised positions which are associated to said frequency compensation would have to be selected.

6. The apparatus according to claim 1, wherein in case said position depends at least on a drift of the drift of the frequency offset, said mapping portion is configured to select said position among all positions associated to a particular code phase offset to compensate for a carrier Doppler drift.

7. The apparatus according to claim 6, wherein for a case that, in order to compensate for said carrier Doppler drift, a position would have to be selected which is not comprised by said coherent memory or said non-coherent memory, respectively, said mapping portion is configured to select a position at a beginning of all positions associated to said particular code phase offset, if a position following comprised positions which are associated to said particular code phase offset would have to be selected, and at an end of all positions associated to said particular code phase offset, if a position preceding comprised positions which are associated to said particular code phase offset would have to be selected.

8. The apparatus according to claim 1, wherein the apparatus is a mobile terminal.

9. An electronic device comprising a signal acquisition module for determining a correct code phase of a received, code modulated carrier signal, said signal acquisition module including:
    a correlation portion configured to provide correlation values for different possible code phase offsets between the received, code modulated carrier signal and an available replica code sequence;
    a frequency compensation portion configured to compensate in the correlation values output by said correlation portion a plurality of possible frequency offsets;
    a coherent memory configured to coherently accumulate during a respective coherent integration cycle correlation values provided by said frequency compensation portion for a respective combination of a specific code phase offset and a specific frequency compensation;
    a non-coherent memory configured to non-coherently accumulate during a non-coherent integration cycle the correlation values accumulated in a respective completed coherent integration cycle in said coherent memory for a respective combination of a specific code phase offset and a specific frequency compensation; and
    a mapping portion configured to map a correlation value which is to be added to one of said coherent memory and said non-coherent memory to a respective position in said coherent memory or said non-coherent memory, respectively, which position is associated to the combination of the specific code phase offset and the specific frequency compensation for which said correlation value is provided, and which position is adjusted depending on at least one of a frequency compensation applied by said frequency compensation portion in combination with elapsed integration time and a drift of a frequency offset in the correlation values output by said correlation portion.

10. The electronic device according to claim 9, wherein said electronic device is a satellite positioning receiver.

11. A method for determining a correct code phase of a received, code modulated carrier signal, said method comprising:
    determining correlation values for different possible code phase offsets between said received, code modulated carrier signal and an available replica code sequence;
    compensating in said determined correlation values a plurality of possible frequency offsets;
    coherently accumulating said frequency compensated correlation values during a respective coherent integration cycle in a coherent-memory for a respective combination of a specific code phase offset and a specific frequency compensation;
    non-coherently accumulating the coherently accumulated correlation values in a non-coherent memory during a non-coherent integration cycle for a respective combination of a specific code phase offset and a specific frequency compensation; and
    mapping a correlation value which is to be added to one of said coherent memory and said non-coherent memory to a respective position in said coherent memory or said non-coherent memory, respectively, which position is associated to the combination of the specific code phase offset and the specific frequency compensation for which said correlation value is provided, and which position is adjusted depending on at least one of an applied frequency compensation in combination with elapsed integration time and a drift of a frequency offset in said determined correlation values.

12. The method according to claim 11, wherein said mapping comprises mapping each accumulated correlation value in said coherent memory to a respective position in said non-coherent memory.

13. The method according to claim 11, wherein said mapping comprises mapping each frequency compensated correlation value to a respective position in said coherent memory.

14. The method according to claim 11, wherein in case said position depends at least on the applied frequency compensation and the elapsed integration time, said mapping comprises selecting said position among all positions associated to said frequency compensation to compensate for a code Doppler effect.

15. The method according to claim 11, wherein in case said position depends at least on the drift of the frequency offset, said mapping comprises selecting said position among all positions associated to a particular code phase offset to compensate for a carrier Doppler drift.

16. A software program product in which a software code for determining a correct code phase of a received, code modulated carrier signal is stored in a readable medium, said software code realizing the following when running in a signal acquisition module:
    determining correlation values for different possible code phase offsets between said received, code modulated carrier signal and an available replica code sequence;
    compensating in said determined correlation values a plurality of possible frequency offsets;
    coherently accumulating said frequency compensated correlation values during a respective coherent integration cycle in a coherent-memory for a respective combination of a specific code phase offset and a specific frequency compensation;
    non-coherently accumulating the coherently accumulated correlation values in a non-coherent memory during a non-coherent integration cycle for a respective combination of a specific code phase offset and a specific frequency compensation; and
    mapping a correlation value which is to be added to one of said coherent memory and said non-coherent memory to a respective position in said coherent memory or said non-coherent memory, respectively, which position is associated to the combination of the specific code phase offset and the specific frequency compensation for which said correlation value is provided, and which position is adjusted depending on at least one of an applied frequency compensation in combination with elapsed integration time and a drift of a frequency offset in said determined correlation values.

17. An apparatus for determining a correct code phase of a received, code modulated carrier signal, said apparatus comprising:
a correlation portion configured to provide correlation values for different possible code phase offsets between the received, code modulated carrier signal and an available replica code sequence;
a frequency compensation portion configured to compensate in the correlation values output by said correlation portion a plurality of possible frequency offsets;
a coherent memory configured to coherently accumulate during a respective coherent integration cycle correlation values provided by said frequency compensation portion for a respective combination of a specific code phase offset and a specific frequency compensation;
a non-coherent memory configured to non-coherently accumulate during a non-coherent integration cycle the correlation values accumulated in a respective completed coherent integration cycle in said coherent memory for a respective combination of a specific code phase offset and a specific frequency compensation; and
a mapping portion configured to map a correlation value stored in one of said coherent memory and said non-coherent memory at a position associated to the combination of the specific code phase offset and the specific frequency compensation for which said correlation value is provided to a respective new position in said coherent memory or said non-coherent memory, respectively, which new position is adjusted depending on at least one of a frequency compensation applied by said frequency compensation portion in combination with elapsed integration time and a drift of a frequency offset in the correlation values output by said correlation portion.

18. The apparatus according to claim 17, wherein said mapping portion is configured to map each accumulated correlation value in said non-coherent memory after a respective coherent integration cycle to a respective new position in said non-coherent memory.

19. The apparatus according to claim 17, wherein said mapping portion is configured to map each accumulated correlation value in said coherent memory after a respective coherent integration cycle to a respective new position in said coherent memory.

20. The apparatus according to claim 17, wherein in case said new position depends at least on the frequency compensation applied by said frequency compensation portion and the elapsed integration time, said mapping portion is configured to select said new position among all positions associated to said frequency compensation to compensate for a code Doppler effect.

21. The apparatus according to claim 20, wherein for a case that, in order to compensate for said code Doppler effect, a new position would have to be selected which is not comprised by said coherent memory or said non-coherent memory, respectively, said mapping portion is configured to select a new position at a beginning of all positions associated to said frequency compensation, if a new position following comprised positions which are associated to said frequency compensation would have to be selected, and at an end of all positions associated to said frequency compensation, if a new position preceding comprised positions which are associated to said frequency compensation would have to be selected.

22. The apparatus according to claim 17, wherein in case said new position depends at least on the drift of the frequency offset, said mapping portion is configured to select said new position among all positions associated to a particular code phase offset to compensate for a carrier Doppler drift.

23. The apparatus according to claim 22, wherein for a case that, in order to compensate for said carrier Doppler effect, a new position would have to be selected which is not comprised by said coherent memory or said non-coherent memory, respectively, said mapping portion is configured to select a new position at a beginning of all positions associated to said particular code phase offset, if a new position following comprised positions which are associated to said particular code phase offset would have to be selected, and at an end of all positions associated to said particular code phase offset, if a new position preceding comprised positions which are associated to said particular code phase offset would have to be selected.

24. The apparatus according to claim 17, wherein the apparatus is a mobile terminal.

25. An electronic device comprising a signal acquisition module for determining a correct code phase of a received, code modulated carrier signal, said signal acquisition module including:
a correlation portion configured to provide correlation values for different possible code phase offsets between the received, code modulated carrier signal and an available replica code sequence;
a frequency compensation portion configured to compensate in the correlation values output by said correlation portion a plurality of possible frequency offsets;
a coherent memory configured to coherently accumulate during a respective coherent integration cycle correlation values provided by said frequency compensation portion for a respective combination of a specific code phase offset and a specific frequency compensation;
a non-coherent memory configured to non-coherently accumulate during a non-coherent integration cycle the correlation values accumulated in a respective completed coherent integration cycle in said coherent memory for a respective combination of a specific code phase offset and a specific frequency compensation; and
a mapping portion configured to map a correlation value stored in one of said coherent memory and said non-coherent memory at a position associated to the combination of the specific code phase offset and the specific frequency compensation for which said correlation value is provided to a respective new position in said coherent memory or said non-coherent memory, respectively, which new position is adjusted depending on at least one of a frequency compensation applied by said frequency compensation portion in combination with elapsed integration time and a drift of a frequency offset in the correlation values output by said correlation portion.

26. The electronic device according to claim 25 wherein said electronic device is a satellite positioning receiver.

27. A method for determining a correct code phase of a received, code modulated carrier signal, said method comprising:
determining correlation values for different possible code phase offsets between said received, code modulated carrier signal and an available replica code sequence;
compensating in said determined correlation values a plurality of possible frequency offsets;
coherently accumulating said frequency compensated correlation values during a respective coherent integration cycle in a coherent-memory for a respective combination of a specific code phase offset and a specific frequency compensation;

non-coherently accumulating the coherently accumulated correlation values in a non-coherent memory during a non-coherent integration cycle for a respective combination of a specific code phase offset and a specific frequency compensation; and mapping a correlation value stored in one of said coherent memory and said non-coherent memory at a position associated to the combination of the specific code phase offset and the specific frequency compensation for which said correlation value is provided to a respective new position in said coherent memory or said non-coherent memory, respectively, which new position is adjusted depending on at least one of an applied frequency compensation in combination with elapsed integration time and a drift of a frequency offset in said determined correlation values.

28. The method according to claim 27, wherein said mapping comprises mapping each accumulated correlation value in said non-coherent memory after a respective coherent integration cycle to a respective new position in said non-coherent memory.

29. The method according to claim 27, wherein said mapping comprises mapping each accumulated correlation value in said coherent memory after a respective coherent integration cycle to a respective new position in said coherent memory.

30. The method according to claim 27, wherein in case said new position depends at least on the applied frequency compensation and the elapsed integration time, said mapping comprises selecting said new position among all positions associated to said frequency compensation to compensate for a code Doppler effect.

31. The method according to claim 27, wherein in case said new position depends at least on the drift of the frequency offset, said mapping comprises selecting said new position among all positions associated to a particular code phase offset to compensate for a carrier Doppler drift.

32. A software program product in which a software code for determining a correct code phase of a received, code modulated carrier signal is stored in a readable medium, said software code realizing the following when running in a signal acquisition module:

determining correlation values for different possible code phase offsets between said received, code modulated carrier signal and an available replica code sequence;

compensating in said determined correlation values a plurality of possible frequency offsets;

coherently accumulating said frequency compensated correlation values during a respective coherent integration cycle in a coherent-memory for a respective combination of a specific code phase offset and a specific frequency compensation;

non-coherently accumulating the coherently accumulated correlation values in a non-coherent memory during a non-coherent integration cycle for a respective combination of a specific code phase offset and a specific frequency compensation; and mapping a correlation value stored in one of said coherent memory and said non-coherent memory at a position associated to the combination of the specific code phase offset and the specific frequency compensation for which said correlation value is provided to a respective new position in said coherent memory or said non-coherent memory, respectively, which new position is adjusted depending on at least one of an applied frequency compensation in combination with elapsed integration time and a drift of a frequency offset in said determined correlation values.

33. An apparatus for determining a correct code phase of a received, code modulated carrier signal, said apparatus comprising:

means for determining correlation values for different possible code phase offsets between said received, code modulated carrier signal and an available replica code sequence;

means for compensating in said determined correlation values a plurality of possible frequency offsets;

means for coherently accumulating said frequency compensated correlation values during a respective coherent integration cycle for a respective combination of a specific code phase offset and a specific frequency compensation;

means for non-coherently accumulating the coherently accumulated correlation values during a non-coherent integration cycle for a respective combination of a specific code phase offset and a specific frequency compensation; and means for mapping a correlation value which is to be added to one of said means for coherently accumulating the frequency compensated correlation values and said means for non-coherently accumulating the coherently accumulated correlation values to a respective position in said means for coherently accumulating the frequency compensated correlation values or said means for non-coherently accumulating the coherently accumulated correlation values, respectively, which position is associated to the combination of the specific code phase offset and the specific frequency compensation for which said correlation value is provided, and which position is adjusted depending on at least one of a frequency compensation applied by said means for compensating the frequency offsets in combination with elapsed integration time and a drift of a frequency offset in said determined correlation values.

34. An apparatus for determining a correct code phase of a received, code modulated carrier signal, said apparatus comprising:

means for determining correlation values for different possible code phase offsets between said received, code modulated carrier signal and an available replica code sequence;

means for compensating in said determined correlation values a plurality of possible frequency offsets;

means for coherently accumulating said frequency compensated correlation values during a respective coherent integration cycle for a respective combination of a specific code phase offset and a specific frequency compensation;

means for non-coherently accumulating the coherently accumulated correlation values during a non-coherent integration cycle for a respective combination of a specific code phase offset and a specific frequency compensation; and means for mapping a correlation value stored in one of said means for coherently accumulating the frequency compensated correlation values and said means for non-coherently accumulating the coherently accumulated correlation values at a position associated to the combination of the specific code phase offset and the specific frequency compensation for which said correlation value is provided to a respective new position in said means for coherently accumulating the frequency compensated correlation values or said means for non-coherently accumulating the coherently accumulated correlation values, respectively, which new position is adjusted depending on at least one of a frequency compensation applied by said means for compensating the frequency offsets in combination with elapsed integration time and a drift of a frequency offset in said determined correlation values.

* * * * *

UNITED STATES PATENT AND TRADEMARK OFFICE
CERTIFICATE OF CORRECTION

PATENT NO. : 7,486,749 B2
APPLICATION NO. : 11/021353
DATED : February 3, 2009
INVENTOR(S) : Pietilä et al.

It is certified that error appears in the above-identified patent and that said Letters Patent is hereby corrected as shown below:

Column 18, line 5, please remove the word "effect" and replace with the word --drift--.

Signed and Sealed this

Second Day of June, 2009

JOHN DOLL
*Acting Director of the United States Patent and Trademark Office*